United States Patent [19]

Yamashita

[11] Patent Number: 4,880,963
[45] Date of Patent: Nov. 14, 1989

[54] ENCODING MAGNETIC CARDS

[76] Inventor: Toshihiko Yamashita, The Third Industry Co. Ltd., 4-43, 2-Chome, Shibata Kita-Ku, Osaka, Japan

[21] Appl. No.: 120,279

[22] Filed: Nov. 13, 1987

[51] Int. Cl.⁴ ............................................. G06K 7/08
[52] U.S. Cl. .................................. 235/449; 235/436; 235/384; 235/482; 360/2
[58] Field of Search ................ 235/449, 493; 360/2, 360/44, 51

[56]  References Cited
U.S. PATENT DOCUMENTS 4,173,026  10/1979  Deming ................................. 360/44
4,180,837  12/1979  Michaud ............................... 360/2 X
4,225,780   9/1980  Jacoub et al. ...................... 235/493 X Primary Examiner—David L. Trafton
Attorney, Agent, or Firm—Townsend and Townsend

[57] ABSTRACT

A system and apparatus for encoding magnetic information on a magnetizable substrate where the substrate is liable to be moved erratically, e.g. manually, past a magnetic head. Two parallel tracks are provided on the substrate and the first is encoded with binary information conventionally with shorter spaces between change of field representing one binary digit and longer spaces representing the other digit. The other track is encoded using changes in field on the first track as a timing reference such that any change of field on the second track substantially coincides with a change of field on the first track and one digit of the binary pair is represented by no change in field as the field changes on the first track while the other binary digit is represented by a change of field coincidentally with a change of field on the first track. The system and apparatus are eminently suited for use in parking meters where a power source to drive a card consistently past a reading head is not available.

7 Claims, 2 Drawing Sheets

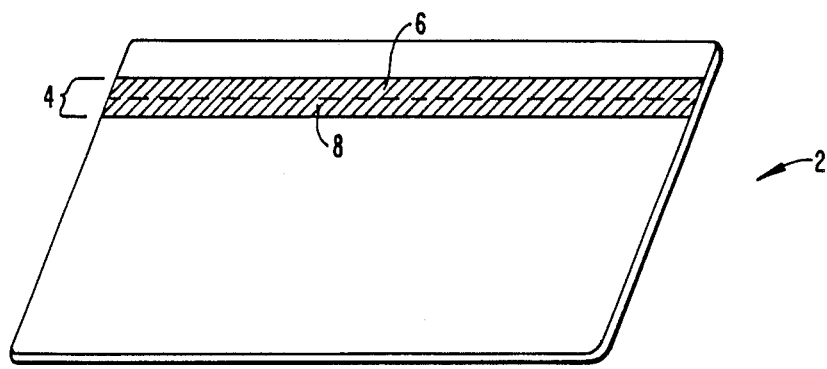
FIG._1.
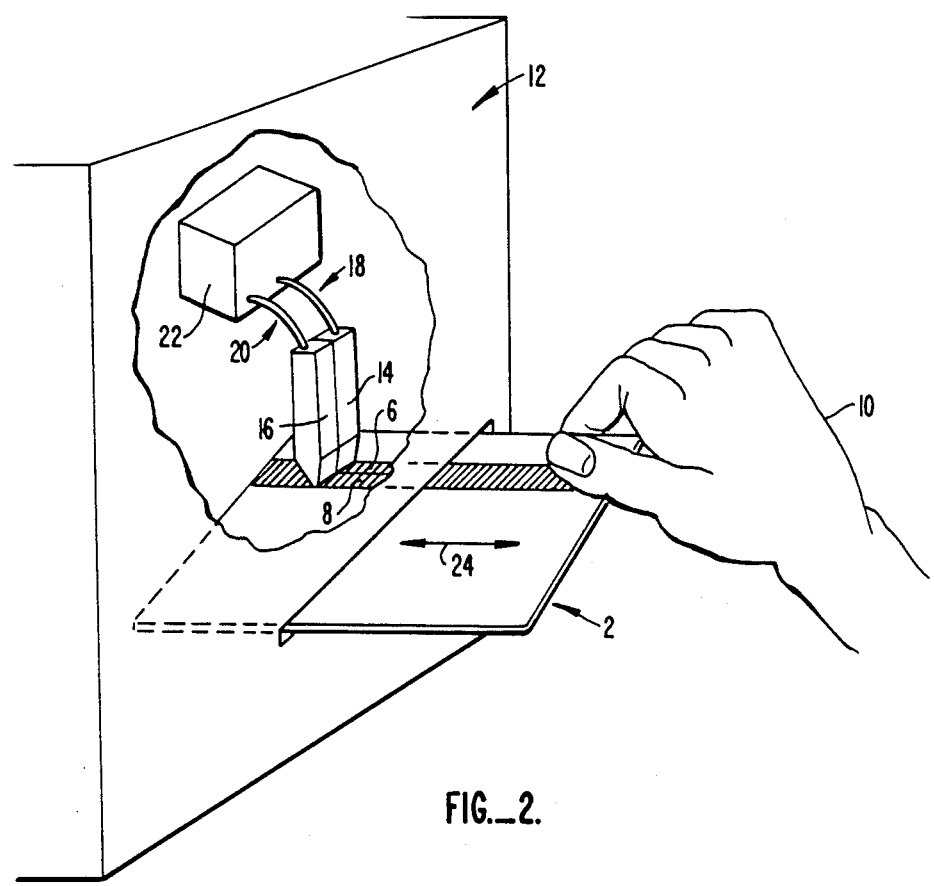
FIG._2.

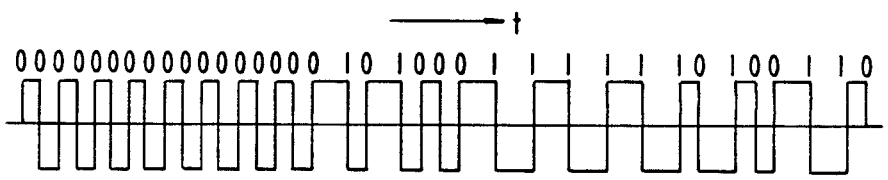
FIG._3.
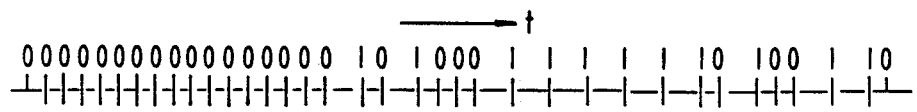
FIG._4.
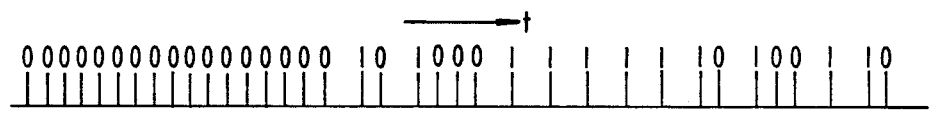
FIG._5.
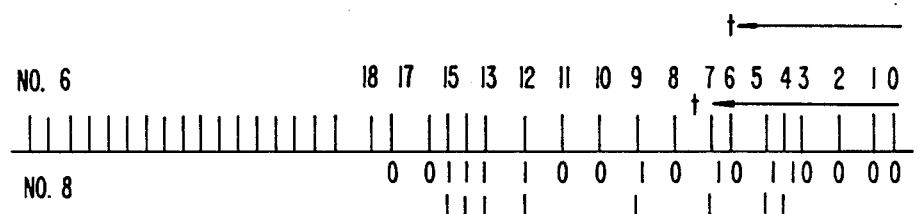
FIG._6.
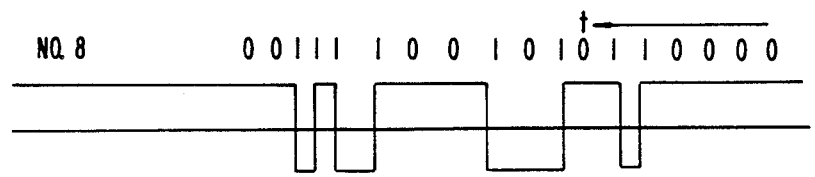
FIG._7.

ENCODING MAGNETIC CARDS

This invention relates to the encoding of magnetic cards or other magnetic substrates and to the associated card writers.

BACKGROUND TO THE INVENTION

Cards which have a strip of magnetic material on them on which information can be encoded magnetically by a card reading and writing head are very well known. They are widely used in electronic banking and to control entry to and exit from public transport systems. In circumstances such as these, however, the card writer is generally a relatively complex piece of machinery and is generally very expensive. Also it is usually housed indoors so that it is well protected from the environment. Further, this usually uses a plentiful supply of electricity to drive some form of electric motor which advances the card past the read-write head at a substantially constant speed so that consistent writing can be achieved.

It would be very desirable to adapt this type of technology to simple situations like parking meters. Thus, a user could get a stored value ticket from a central location and then insert that into a parking meter where he parks his car and the parking meter would then automatically check the ticket, extract the appropriate time by reading the remaining time on the stored value ticket and re-writing with the reduced remaining value. Parking meters, however, do not have a ready supply of electricity for driving a motor and also it would not be practical to use a very expensive card writer in such circumstances because of the numerous parking meters which exist.

It is therefore an object of the invention to provide a system which is much simpler and whereby the user can manually insert and withdraw the ticket so that only a relatively small power supply, e.g. as obtainable from a battery pack, is necessary to drive the electronics associated with the read-write head.

BRIEF SUMMARY OF THE INVENTION

According to the invention, there is provided a system for encoding magnetic information on a magnetic substrate in which the substrate has two parallel tracks, on the first track, binary information is encoded conventionally with shorter spaces between changes of field representing one of the two binary digits and longer spaces representing the other of the two binary digits, and the second track is encoded with binary information in such a way that a change of field substantially coincides with a change of field in the first track and one digit of the binary pair is represented by no change in field as the field changes on the first track whilst the other binary digit is represented by a change of field at the same time as a change of field on the first track.

By following such a system, one can provide a relatively simple read-write head and writing means for encoding the information. Thus, electric means for driving the card are not necessary and the card can be advanced and retracted manually. Obviously this will risk having one user moving the card faster past the read-write head than another user. In the system according to the invention, however, this does not matter because the absolute timing of changes of field on the track are not relevant but only the relative timing of changes of field as between one track and the other. It is therefore possible to use this system in simple circumstances such as the example of the parking meter noted above where only a relatively low amount of battery power is available which would be more than sufficient to operate the read-write head but would not be sufficient to operate, say, an electrical drive motor for advancing the card.

In, say, the parking meter example noted above, the first track can be encoded with binary information representing the time and place of purchase of the stored value ticket. Simultaneously with purchase, the second track can be encoded with the time of the ticket. Then as the ticket is used the second track is read to determine the amount of time remaining, the allowed parking time is deducted and the second track re-written according to the then remaining stored time.

The invention will now be illustrated, with reference with the accompanying drawings, which show a number of timing graphs explaining the operation of the invention.

BRIEF DESCRIPTION OF THE DRAWINGS

FIG. 1 shows a card or ticket magnetically encoded according to the present invention;

FIG. 2 is a partial cutaway view showing a card or ticket being encoded and/or decoded according to the present invention;

FIG. 3 is a plot of magnetic field versus distance, for the first track 6 according to the present invention;

FIG. 4 is a plot of magnetic read-head electrical output versus time for the first track 6, corresponding to the magnetic field of FIG. 3;

FIG. 5 is a plot of the signals for the first track 6 shown in FIG. 4 after the signals have been rectified and amplified;

FIG. 6 is a plot of magnetic write-head electrical output versus time, for writing data to the second track 8 using the signals for the first track 6 as timing pulses;

FIG. 7 is a plot of magnetic field versus distance for the second track 8, corresponding to the electrical output signals for the second track 8 as shown in FIG. 6.

DESCRIPTION OF THE PREFERRED EMBODIMENT

A card carrying a magnetic strip is a well known item of commerce and so will not itself be described. Additionally, the read-write head and the associated electronics will not be described in detail since they are also well known.

FIG. 1 shows a card 2, having a magnetizable substrate 4 with first and second parallel tracks 6 and 8 for holding magnetically encoded binary digital data. It is to be understood that while FIG. 1 shows tracks 6 and 8 separated by a boundary line, in reality, tracks 6 and 8 would appear to the eye as a continuum within substrate 4.

FIG. 2 shows card 2 being inserted by a user's hand 10 into a device 12 that includes first and second separate read-write heads 14, 16 mounted side-by-side. Read-write heads 14, 16 are connected, respectively, by first and second wire pairs 18, 20 to a magnetic encoder decoder 22. Because heads 14, 16 and encoder/decoder 22 are known in the art, Applicant will not describe them in further detail.

Device 12 may be part of a parking meter, or it may be centrally located. In either event, as card 2 is moved lengthwise (as shown by arrow 24) within device 12, read-write heads 14, 16 contact, respectively, tracks 6 and 8. As determined by encoder/decoder 22, heads 14, 16 then read magnetic data from or write magnetic data to tracks 6 and/or 8.

Referring to the timing graph shown in FIG. 3, shows plotted against distance the magetic field on track 6 of the magnetic strip. It has been assumed that the binary information to be encoded is 00000000000000000 10 1000 11111 10 100 1 10. This is represented in entirely conventional fashion by fields which appear above the longitudinal axis as magnetic north and fields below the longitudinal axis as magnetic south. The actual question of whether a field is north or south is irrelevant as to the question of whether the field represents a binary 0 or a binary 1. As is entirely conventional, a binary 0 is represented by a short field which changes from a north to a south or a south to a north after one unit of length whilst a binary 1 is represented by a longer field of substantially twice the length. Thus the change can be from a north to a south or a south to a north but provided the change occurs after a short length that represents a binary 0 and after a long length represents a binary 1.

FIG. 4 shows plotted against time the electrical output from a magnetic read-head such as head 14. At each change of field, a pulse arises and it can be seen that again it is the spacing between the pulses which determines whether the pulse represents a binary 0 or a binary 1. Thus, a short space represents a binary 0 and a longer space a binary 1. As is conventional that electrical signal is rectified and amplified to give pulses as shown in FIG. 5 and the electronics associated with the system will recognise this as the binary encoded information 000000000000000001010001111110100110 in the example shown.

The magnetic encoded information on this a first track 6 is inserted at a central accurate location where the magnetic write head will be electrically driven and so the spacings and timings of the binary 0 and 1 can be accurately determined. The encoding may be done with device 12 at a central location, where signals from encoder/decoder 22 travelling along wire pair 18 cause head 14 to magnetically encode track 6 with the desired binary information. In a card according to the invention, this first track is not thereafter altered by the read-write head of the parking meter but in effect this track is used as a timing pulse clock for the second track 8. This first track however does contain basic information relating to the card and for example the encoded information can represent the centralised location where the card was purchased, the date of purchase, its initial value and so on.

At the time of purchase of the card, the second track is also encoded with information relating to the amount of time remaining in the ticket and the second track will of course conventionally be positioned on the same magnetic strip on the card alongside the first track and the encoding of two tracks on a magnetic strips is entirely conventional and analogous, for example, to the method of recording stereo signals on audio magnetic tapes. Track 8 may be encoded with device 12 at a central location, where signals from encoder/decoder 22 travelling along wire pair 20 cause head 16 to magnetically encode track 8 with the desired binary information.

When the user inserts the ticket into a parking meter such as device 12 in FIG. 2, it will be read in a manner described below and then when he thereafter removes the ticket, new information concerning the amount of the stored time will be encoded on the second track 8. We will take for example the situation where the information to be encoded is the binary number 000011010100111100.

As the user withdraws the ticket from the machine, this information has to be encoded but of course the user may not withdraw the ticket at a uniform speed as would an electric motor and equally one user may withdraw a ticket at a different rate from another user. Therefore, in accordance with the invention, the first track is used as a timing pulse clock during the writing of the amended information on the second track.

To achieve this, the electronics associated with the system writes only a pulse when a binary 1 is to be recorded and no electronic pulse when a binary 0 is to be recorded. Such electronics may be included within encoder/decoder 22. Additionally, the binary number to be recorded on the second track is synchronized with the pulses read from the first track. Turning to FIG. 6, it can be seen that as the card is withdrawn, the first track will provide from the read head 14 a series of pulses in the manner as has been described above in connection with FIGS. 3-5. The pulses will be spaced apart at varying distances depending upon whether they are to represent a binary 0 or a binary 1. As far as writing in the second track is concerned, it is irrelevant whether these pulses from track 1 are binary 0 or binary 1 and purely important to consider a pulse which represents a change of field. On receipt of the first pulse, the second track is either written, i.e. the field changed, if a binary 1 is to be written and so a pulse is provided or no pulse is provided for the second track if a binary 0 is to be written. This continues and it can be seen that for the first four pulses, i.e. 0 to 3 received from the track 6, no corresponding pulse is provided for writing on track 8. However, at the fifth pulse, i.e. number 4 where a binary 1 is to be written, then a pulse is provided and the field of the write head 16 for track 8 changes polarily. At the sixth pulse, i.e. number 5, another binary 1 is to be written and so the field is changed again. This continues as the card is withdrawn. It should be emphasized again that the spacing of the pulses 0 to 18 on track 6 are immaterial and it is only when a binary 1 is to be written that a pulse and so a corresponding field change is provided for track 8.

If one follows along FIG. 7, one can see the resulting field which will be provided on track 8, using the same format as in FIG. 3 for first track 6, and the number which has been written is indeed the number 000011010100111100.

When the card is next used and inserted into a parking meter, the reverse occurs. Again, track 6 is used solely as a timing pulse clock to enable accurate readings of binary encoded information to be obtained from track 8.

No detailed explanation has been given of the actual electronics associated with the reading and writing of the heads and tracks since this is entirely conventional and no further explanation is believed required. However, it can be seen from this explanation how on track 8 magnetically encoded information can be provided in a very simple fashion where there can be accurate discrimination between binary 1s and binary 0s without having at the same time to have an accurate absolute timer or, for that matter, an accurate absolute distance between changes of fields on track 8 to represent binary 0s and binary 1s as is conventional and necessary for track 6 where track 6 is of course written centrally by an accurate machine.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A system for encoding information on a magnetisable substrate, in which said substrate has first and second parallel tracks, on said first track, binary information is encoded with shorter spaces between changes of field representing one of the two binary digits and longer spaces representing the other of the two binary digits, and said second track is encoded with binary information in such a way that any change of field substantially coincides with a change of field in the first track and one digit of the binary pair is represented by no change in field on the second track as the field changes on the first track whilst the other binary digit is represented by a change of field on the second track coincidentally with a change of field on the first track.

2. A system according to claim 1 in which said magnetic substrate is provided as a stripe of magnetisable material on a flat card.

3. A system according to claim 1 as applied to parking meters, in which said magnetic substrate is provided on a ticket, said two tracks are encoded with information at a central location, and a parking meter itself has a read/write head capable of reading information from said second track when the magnetic substrate is manually moved past said head and if appropriate rewriting encoded information on said second track after deduction of appropriate parking charges.

4. A system according to claim 3 in which said first track is encoded at said central location with information representing the time and place of purchase, and said second track is encoded with information relating to the value of the ticket, said read/write head in a parking meter reading that information as said ticket is inserted into a meter and writing on said second track information as to the remaining value, if any, of the ticket after deduction of parking charges as said ticket is withdrawn from said meter.

5. A card carrying a magnetisable substrate which has been encoded by a system according to claim 2.

6. Apparatus for encoding information on a magnetisable substrate which has a magnetic head capable of writing first and second parallel tracks on said substrate, on said first track binary information being encoded with shorter spaces between changes of field representing one of the two binary digits and longer spaces representing the other of the two binary digits, and on said second track binary information is encoded in such a way that any change of field substantially coincides with a change of field in said first track and one digit of the binary pair is represented by no change in field on said second track as the field changes on said first track whilst the other binary digit is represented by a change of field on said second track coincidentally with a change of field on said first track.

7. Apparatus for reading and encoding information on a magnetisable substrate, comprising a magnetic head capable of reading and writing magnetically encoded information from first and second parallel tracks on the substrate, said first track having been encoded with binary information represented by changes in the magnetic field of that track and said second track having been encoded with binary information in such a way that any change of field substantially coincides with a change of field on said first track and one digit of the binary pair is represented by no change in field on said second track as the field changes on said first track whilst the other binary digit is represented by a change of field on said second track coincidentally with a change of field on said first track, electronic means for receiving signals from said head and determining the binary information encoded on said second track in a first pass of said substrate past said head in one direction and sending signals to said head to rewrite said second track in a second pass of said substrate past said head in a direction opposite to said first pass in such a manner that any change of field substantially coincides with a change of field of said first track and one digit of the binary pair is represented by no change in field on said second track as the field changes on said first track whilst the other binary digit is represented by a change of field on said second track coincidentally with a change of field on said first track.

* * * * *